United States Patent Office 3,483,168
Patented Dec. 9, 1969

3,483,168
EPOXY RESIN MOULDING COMPOSITIONS
Ewald Forster, Daniel Porret, and Peter Ruf, Binningen, Switzerland, assignors to Ciba Limited, Basel, Switzerland, a company of Switzerland
No Drawing. Filed Aug. 22, 1966, Ser. No. 573,883
Claims priority, application Switzerland, Sept. 21, 1965, 13,066/65
Int. Cl. C08g 30/08, 30/14
U.S. Cl. 260—77.5                 2 Claims

ABSTRACT OF THE DISCLOSURE

Curable moulding compositions containing (1) triglycidyl isocyanurate, that preferably contains at least 14% of epoxide oxygen, (2) as curing agent a primary or secondary cycloaliphatic polyamine and (3) fillers.

---

Epoxy resin moulding compositions based on conventional epoxy resins, for example polyglycidyl ethers of bisphenol A (para,para'-isopropylidenediphenol), are known. The mouldings made from them are distinguished by their good electrical and mechanical properties. However, compared with the known moulding compositions based on phenolic resins, urea resins or melamine resins they have the disadvantage that they have a much shorter pot life. Therefore, they can be transported from the manufacturer of the moulding composition to the consumer, especially during the hot season, only in special cooled containers. The moulding works generally have special cooled containers for storing the moulding compositions before moulding. Furthermore, the conventional moulding compositions often do not satisfy the increasingly stringent demands on heat stability. Notwithstanding their generally very good electrical properties they remain unsuitable for use in some electrical applications, more especially because of their substantially reduced leakage resistance after even a short thermal stress.

The present invention is based on the surprising observation that storable moulding compositions that lend themselves well to moulding and possess excellent electrical properties and display moreover higher heat distortion values than the known compositions based on polyglycidyl ethers of bisphenol A or on phenol novolaks or cresol novolaks are obtained by curing triglycidyl isocyanurate with a cycloaliphatic polyamine. The new moulding compositions also have an excellent fastness to light.

Accordingly, the present invention provides curable moulding compositions containing (1) triglycidyl isocyanurate, that preferably contains at least 14% of epoxide oxygen, (2) as curing agent a primary or secondary cycloaliphatic polyamine and (3) fillers.

The triglycidyl isocyanurate to be used in the present invention can be prepared by reacting cyanuric acid with epichlorohydrin in the presence of a quaternary base at an elevated temperature, preferably under reflux, whereupon hydrogen chloride is eliminated by adding a strong alkali. The reaction may be carried out under anhydrous conditions by continuously removing the water by azeotropic distillation. It is advantageous to recrystallize the crude triglycidylisocyanurate obtained after working up. Depending on the molecular ratio between cyanuric acid and epihalohydrin employed there are obtained products having a more or less high content of epoxide oxygen. A particularly suitable epihalohydrin is epichlorohydrin.

The curing agent used in the moulding compositions of this invention is a primary or secondary cycloaliphatic polyamine, including any substance of this group conventionally used as curing agent for epoxy resins. Particularly suitable cycloaliphatic polyamines are 1,2-, 1,3- and 1,4- diaminocyclohexane, 1,2,3-, 1,2,4- and 1,3,5-triaminocyclohexane 1,8-paramenthanediamine, 1,2-, 1,3- and 1,4-bis(aminomethyl)cyclohexane, the various isomers of tris(aminomethyl)cyclohexane, the isomers of bis(4-aminocyclohexy)methane, bis(4-aminocyclohexyl)ethane, bis(4 - aminomethylcyclohexyl)cyclohexylmethane, 1--propane, -butane and -pentane, dodecahydrobenzidine, amino - 3 - aminomethyl - 3,5,5 - trimethylcyclohexane and polyamines of the type

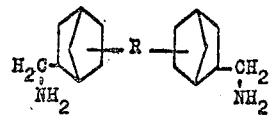

where R represents a divalent organic or silicoorganic residue, such, for example as 1,4-bis(2'-aminomethylbicyclo[2,2,1]heptyl)butane,
β,β'-bis(2'-aminomethyl-bicyclo[2,2,1]heptyl)diethyl ether,
1,4-bis(2'-α-aminoethylbicyclo[2,2,1]heptyl)butane,
β,β'-bis(2-aminomethyl-bicyclo[2,2,1]methylheptyl)-diethyl ether,
bis(2-aminomethyl-bicyclo[2,2,1]heptyl)-dimethylsilane,
1,4-bis(2'-aminomethylbicyclo[2,2,1]heptyl)-cyclopentane,
1,6-bis(2'-aminomethylbicyclo[2,2,1]heptylmethyl)-xylol-1,3,
2,4-bis(2'-aminomethyl-bicyclo[2,2,1]heptylmethyl)-mesitylene and
bis(2'-aminomethyl-bicyclo[2,2,1]heptylmethyl)durene.

Although diprimary diamines are given preference, secondary amines are equally suitable, for example the monoallyl derivatives of the polyamines mentioned above. The cyclic residues of the amines may be substituted, for example, by alkyl or alkoxy groups or by halogen atoms.

A specially preferred cycloaliphatic amine is bis(4-aminocyclohexyl)dimethylmethane.

For the manufacture of moulding compositions ready for use there are added as component (3) one or several fillers to the other two components, i.e. the epoxy resin and the curing agent. Suitable fillers are inorganic as well as organic substances which may but need not act as reinforcing agents. As inorganic fillers not acting as reinforcers there may be mentioned quartz meal, mica, aluminium powder, iron oxide, ground chalk, ground slate, unburnt kaolin (bolus) and burnt kaolin. As organic fillers not having a reinforcing effect there may be mentioned wood meal and cellulose. The content of filler in the moulding composition ranges in general from 40 to 190% of the amount of epoxy resin used, and depends on the type of filler(s) used and the properties which the moulding composition, or the mouldings produced from it, is/are desired to have.

Suitable reinforcing fillers are inorganic, fibrous substances, for example glass fibres, asbestos fibres or organic native or synthetic fibres, such as cotton, polyamide, polyester or polyacrylonitrile fibres.

Apart from fillers the moulding compositions may contain also other known additives and modifiers for such compositions, such as lubricants, pigments, dyestuffs, curing accelerators, stabilizers, plasticizers or flame-inhibitors.

The moulding compositions of this invention may be manufactured by various known methods.

For example, the epoxy resin and any further optional soluble additives present in the moulding composition, for example the curing agent, may be dissolved in a solvent such as acetone or dichloroethane, and the resulting low-viscous solution is then mixed with the other, insoluble components, such as fillers, pigments and the like.

Alternatively, a paste may be prepared by heating the epoxy resin and/or by adding a small quantity of a suitable liquid to the epoxy resin and possibly other additives, and the other components of the moulding composition are then incorporated with this paste.

Finally, the addition of solvents may be entirely dispensed with and the epoxy resin mixed at room temperature, or with very moderate heating, in the solid state with the other components by the so-called dry method in a suitable mixer, for example in a ball mill.

The choice of the mixing method is governed in the first place by the fillers and/or reinforcing agents used. For fibrous reinforcing agents the wet mixing method will be preferred because in this operation the initial length of the fibres remains substantially unimpaired.

If desired, the moulding compositions of this invention may be marketed in a form suitable for charging them into press moulds or the like, such as lozenges, tablets or granules.

To assess the flowability of the moulding compositions the following two methods were employed in the following examples.

(1) Measuring the "cup value"

In this test method 70 g. of the moulding composition are introduced in a cup according to DIN 53,465 which is heated at 165° C. and a moulding is formed. The test moulding is subjected to the following examinations: (a) if the moulding has no flash—the mean height of the moulding; (b) if the moulding has a flash—the amount of flash.

A fully moulded cup without flash is given the cup value 7. When the flowability of the moulding composition under the moulding pressure used is insufficient to fill the mould completely, the mean height of the moulding formed is measured with a ruler of equal divisions, the zero point coinciding with the bottom of the cup and division 7 with the top edge of the fully moulded cup. Thus, for example, a cup value of 3½ characterizes a moulding which has filled the cup mould only to 50%.

The cup values of test mouldings that have a flash are assessed by removing and weighing the flash. The cup value (CV) is calculated from the formula $$CV = 7 + \frac{\text{weight of flash in grams}}{2}$$

The maximum value of the cup value scale is 10, which corresponds to a flash weighing 6 g. or more.

(2) Measuring the mould closing time according to DIN 53,465

The moulding composition is introduced into a cup mould according to DIN 53,465 heated at 165° C., and the mould is closed. The time from the introduction of the moulding composition to the moment when the internal pressure begins to rise should be 15 seconds±1 second. The travelling speed of the plunger until it makes contact with the moulding composition should be 2 cm. per second ±0.5 cm./second.

By means of a stop watch the mould closing time is determined from the moment when the pressure begins to rise (as indicated by the pressure gauge on the press) until the plunger comes to a stop (as indicated by a lever-actuated indicator on the press or a timer).

Percentages in the following examples are by weight.

*Manufacturing instruction A.*—A mixture of 25.8 g. of cyanuric acid, 1665 g. of epichlorohydrin and 0.3 g. of benzyl triethyl ammonium chloride was heated to the boil at 115° C. in a flask equipped with reflux condenser and agitator. After 60 minutes the cyanuric acid had dissolved completely. After another 60 minutes the solution was cooled to 100° C., and then in the course of 150 minutes 64 g. of sodium hydroxide solution of 50% strength were dropped in. During the whole time the water was distilled off azeotropically at 100 to 110° C., and the sodium chloride suspension was then cooled and filtered. The yellow filtrate was concentrated in a rotary evaporator at 60° C. The resulting residue was further evaporated under a high vacuum until its weight remained constant.

Yield: 62 g. of a yellow, viscous resin. This crude product had an epoxide content of 9.0 epoxide equivalents per kg. and a chlorine content of 2.3%.

The crude product thus obtained was intimately stirred with 200 ml. of isopropanol. A white, crystalline substance formed which after 1 hour at room temperature was filtered off and washed with 2×30 ml. of isopropanol. After drying in a vacuum cabinet at 60° C. 49.5 g. of a dry, white powder were obtained which contained 9.7 epoxide equivalents per kg. (=15.6% of epoxide oxygen) and 0.72% of chlorine. The yield corresponded to 83.5% of the theoretical, referred to the cyanuric acid used.

*Manufacturing instruction B.*—A mixture of 25.8 g. of cyanuric acid, 278 g. of epichlorohydrin and 0.3 g. of benzyl triethyl ammonium chloride was heated to the boil at 115° C. After 60 minutes the cyanuric acid had dissolved and the batch was allowed to react for another 60 minutes. Then 64 g. of sodium hydroxide solution of 50% strength were added dropwise within 150 minutes. During this time the water was distilled off azeotropically at 100 to 110° C. The sodium chloride suspension was then cooled and filtered. The yellow filtrate was concentrated in a rotary evaporator down to 70° C., to yield 65 g. of a crude product which contained 8.2 epoxide equivalents per kg.

The product was intimately stirred with 180 ml. of isopropanol at room temperature. After one hour the precipitated crystalline substance was filtered off and washed with 2×20 ml. of isopropanol. After drying in a vacuum drying cabinet at 60° C. there were obtained 41.5 g. of a dry, white powder which contained 9.1 epoxide equivalents per kg. (=14.6% of epoxide oxygen) and 1.2% of chlorine. The yield corresponded to 69% of the theoretical, referred to the cyanuric acid used.

Manufacturing instruction C.—A mixture of 362 g. of cyanuric acid, 3900 g. of epichlorohydrin and 4 g. of benzyl triethyl ammonium chloride was stirred at 100 to 110° C. in a flask equipped with reflux condenser and agitator. 60 minutes later the cyanuric acid was completely dissolved. After another hour 896 g. of sodium hydroxide solution of 50% strength were dropped in within 2 hours. During this dropwise addition the water was distilled off azeotropically at 100 to 110° C., whereas the epichlorohydrin was allowed to flow back into the reaction flask. After another 20 minutes the mixture was cooled and filtered. The yellow filtrate was concentrated at 60° C. in a rotary evaporator, to yield 836 g. of a yellow, viscous resin having an epoxide content of 7.8 epoxide equivalents per kg. (=12.4% of epoxide oxygen). The crude product thus obtained was intimately stirred with 1300 g. of isopropanol. A white, crystalline substance settled out which was filtered off after 2 hours at room temperature and washed with 2× 100 g. of isopropanol. After drying in a vacuum drying cabinet at 60° C. 650 g. of a dry, white powder were obtained which contained 13.6% of epoxide oxygen (=8.5 epoxide equivalents per kg.) and 1.0% of chlorine. The yield amounted to 79% of the theoretical, referred to cyanuric acid. The product proved to be completely stable at room temperature.

EXAMPLE 1

300 grams of the triglycidyl isocyanurate prepared according to manufacturing instruction A and 180 g. of 4,4′-diaminodicyclohexyl dimethylmethane were dissolved in 225 g. of acetone. At the same time a pre-mix of 480 g. of burnt kaoline (registered trademark Molochite) and 15 g. of calcium stearate was prepared in a divided-trough mixer. A solution of triglycidyl isocyanurate and curing agent in acetone was then added to this mixture and the whole was thoroughly homogenized, to form a paste into which 150 g. of glass fibres (6 mm. long) were strewn in in small portions. When the glass fibres had been evenly distributed, the dough was dried in a vacuum cabinet for 6 hours at 60° C., and the product was then granulated.

The resulting moulding compositions lent themselves readily to moulding at 165° C. without preheating. The moulding times were chosen as is usual for epoxy resin moulding compositions based on conventional epoxy resins, for example the Araldite moulding compositions (registered trademark), namely:

3 minutes for sheets 2 mm. thick
4 minutes for VSM rods (60 × 10 × 4 mm.)
8 minutes for DIN rods (120 × 15 × 10 mm.).

EXAMPLE 4

100 grams of the triglycidyl isocyanurate obtained according to manufacturing instruction C were dissolved in 75 g. of acetone and mixed in a laboratory type divided-trough mixer with 55 g. of 4,4'-diaminodicyclohexyl dimethylmethane, 5 g. of calcium stearate and 155 g. of burnt kaolin (registered trademark Molochite). After 15 minutes 50 g. of glass fibres 6 mm. long were strewn in and well distributed in the mixture within 15 minutes. The dough was then dried in a vacuum cabinet for 2 hours at 60° C.

EXAMPLE 5

100 grams of the triglycidyl isocyanurate used in Example 1 were dissolved in 75 g. of acetone and mixed

TABLE 1.—MOULDING COMPOSITION OF EXAMPLE 1

| Property | Test method | Unit | |
|---|---|---|---|
| Specific gravity of moulding | | | 1.65 |
| Cup value (test pressure) | | Value | 7¼ |
| | | (Test pressure, kg./cm.$^2$) | (500) |
| | | Seconds | 19 |
| Mould closing time (test pressure) | DIN 53 465 | (Test pressure, kg./cm.$^2$) | (500) |
| After 24 hours' storage at 40° C.: | | Value | 7 |
| Cup value (test pressure) | | (Test pressure in kg./sq. cm) | (500) |
| | | Seconds | 21 |
| Mould closing time (test pressure) | DIN 53 465 | (Test pressure in kg./sq. cm.) | (500) |
| After 24 hours' storage at 50° C.: | | Value | 7 |
| Cup value (test pressure) | | (Test pressure in kg./sq. cm.) | (500) |
| | | Seconds | 21 |
| Mould closing time (test pressure) | DIN 53 465 | (Test pressure in kg./sq. cm.) | (500) |
| Mould shrinkage | DIN 53 464 | Percent | 0.47 |
| After-shrinkage, 48 h. 110° C | DIN 53 464 | do | 0.03 |
| After-shrinkage, 168 hours, 110° C | DIN 53 464 | do | 0.07 |
| Flexural strength | VSM 77 103 | Kg./mm.$^2$ | 6.8 |
| Impact strength | VSM 77 105 | Cm. kg./cm.$^2$ | 3.6 |
| Notch strength | VSM 77 105 | Cm. kg./cm.$^2$ | 2.8 |
| Heat distortion point according to Martens | DIN 53 458 | ° C | 135 |
| Flammability | VDE 1930 | Stage seconds | 0 / 60 |
| Loss factor tg δ (50 cps. 20° C.) | VDE 0303 | | 0.014 |
| Dielectric constant ε (50 cps. 20° C.) | VDE 0303 | | 6.1 |
| Specific resistance; dry | VDE 0303 | Ohm × cm | $2.4 \cdot 10^{14}$ |
| After 24 hrs. in water at 23° C | VDE 0303 | Ohm × cm | $1.3 \cdot 10^{12}$ |
| Surface resistance: dry | VDE 0303 | Ohm | $5.5 \cdot 10^{12}$ |
| After 24 hrs. in water at 23° C | VDE 0303 | Ohm | $1.6 \cdot 10^{10}$ |
| Leakage resistance | VDE 0303 | Stage | KA 3c |

EXAMPLE 2

100 grams of the triglycidyl isocyanurate used in Example 1 were dissolved in 75 g. of acetone and in a laboratory type divided-trough mixer mixed with 55 g. of 4,4'-diaminodicyclohexyl dimethylmethane, 3 g. of calcium stearate and 155 g. of ground chalk. After 15 minutes 50 g. of glass fibres 6 mm. long were strewn into the mixture and well distributed in it within 15 minutes The dough was then dried for 2 hours ot 60° C. in a vacuum cabinet.

EXAMPLE 3

100 grams of the triglycidyl isocyanurate prepared according to manufacturing instruction B were dissolved in 75 g. of acetone and mixed in a laboratory type divided-trough mixer with 60 g. of 4,4'-diaminodicyclohexyl dimethylmethane, 5 g. of calcium stearate and 160 g. of ground chalk. After 15 minutes, 50 g. of glass fibres 6 mm. long were strewn into the mixture and distributed well in it for 15 minutes. The dough was dried at 60° C. for 2 hours in a vacuum cabinet.

in a laboratory type divided-trough mixer with 60 g. of 4,4'-diaminodicyclohexyl dimethylmethane, 3 g. of calcium stearate and 160 g. of burnt kaloin (registered trademark Molochite). After 15 minutes 50 g. of glass fibres 6 mm. long were strewn in and within 15 minutes well distributed in the mixture. The dough was then dried for 2 hours at 60° C. in a vacuum cabinet.

Similar to the moulding composition prepared as described in Example 1, the products of Examples 2 to 5 lent themselves well to moulding at 165° C. and were easy to remove from the mould. The following Table 2 lists the properties of mouldings manufactured from these moulding compositions:

TABLE 2

| | | | Moulding composition according to Example— | | | |
|---|---|---|---|---|---|---|
| Property | Test Method | Unit | 2 | 3 | 4 | 5 |
| Heat distortion pt. according to Martens | DIN 53 458 | ° C | 186 | 173 | 173 | 204 |
| Loss factor tgδ (50 cps. at 20° C.) | VDE 0303 | | 0.014 | 0.012 | 0.015 | 0.014 |
| Dielectric constant ε(50 cps. at 20° C.) | | | 6.31 | 6.1 | 5.8 | 5.7 |
| Specific resistance: dry | VDE 0303 | Ohm × cm | $1.5 \cdot 10^{15}$ | $3.3 \cdot 10^{15}$ | $2.5 \cdot 10^{15}$ | $2.7 \cdot 10^{15}$ |
| After 24 hours in water at 23° C | VDE 0303 | Ohm × cm | $2.2 \cdot 10^{13}$ | $1.1 \cdot 10^{14}$ | $3.9 \cdot 10^{14}$ | $6.3 \cdot 10^{14}$ |
| Leakage resistance | VDE 0303 | Stage | KA 3c | KA 3c | KA 3c | KA 3c |

Mouldings prepared according to Example 5 were stored for a prolonged period at 150° C. and their leakage resistance was then measured. After one month's storage at 150° C. they still had the initial value of KA 3c (measured according to VDE Standard 0303).

What is claimed is:
1. A curable moulding composition, essentially consisting of (1) triglycidyl isocyanurate, (2) as curing agent a diprimary cycloaliphatic diamine, said cycloaliphatic diamine comprising in its molecular structure two cyclohexane rings and (3) a filler.

2. A moulding composition according to claim 1, containing as curing agent 4,4'-diaminodicyclohexyl dimethylmethane.

References Cited
UNITED STATES PATENTS

| | | | |
|---|---|---|---|
| 2,741,607 | 4/1956 | Bradley et al. | 260—248 |
| 2,809,942 | 10/1957 | Cooke | 260—2 |
| 2,981,711 | 4/1961 | Meyer et al. | 260—31.2 |
| 3,023,190 | 2/1962 | Damusis | 260—47 |
| 3,264,350 | 8/1966 | Renner et al. | 260—563 |
| 3,300,490 | 1/1967 | Budnowski | 260—248 |
| 3,337,509 | 8/1967 | Budnowski | 260—77.5 |

DONALD E. CZAJA, Primary Examiner

M. J. WELSH, Assistant Examiner

U.S. Cl. X.R.

260—2, 9, 18, 37